United States Patent
Legare

(10) Patent No.: US 10,295,242 B2
(45) Date of Patent: May 21, 2019

(54) PASSIVELY TEMPERATURE CONTROLLED STORAGE CONTAINER FOR AN AUTOMOBILE

(71) Applicant: David Legare, Ava, NY (US)

(72) Inventor: David Legare, Ava, NY (US)

(*) Notice: Subject to any disclaimer, the term of this patent is extended or adjusted under 35 U.S.C. 154(b) by 0 days.

(21) Appl. No.: 15/591,905

(22) Filed: May 10, 2017

(65) Prior Publication Data
US 2017/0328623 A1    Nov. 16, 2017

Related U.S. Application Data

(60) Provisional application No. 62/334,016, filed on May 10, 2016.

(51) Int. Cl.
| | |
|---|---|
| *F25D 3/06* | (2006.01) |
| *B65D 81/38* | (2006.01) |
| *F25D 23/10* | (2006.01) |
| *B60N 2/60* | (2006.01) |
| *B60N 2/90* | (2018.01) |

(52) U.S. Cl.
CPC .............. *F25D 3/06* (2013.01); *B60N 2/60* (2013.01); *B65D 81/3897* (2013.01); *F25D 23/10* (2013.01); *B60N 2002/905* (2018.02); *F25D 2331/801* (2013.01)

(58) Field of Classification Search
CPC .............. F25D 3/08; F25D 2331/804; F25D 2303/0831; F25D 3/06; F25D 23/10; F25D 2331/801; F25D 16/00; B65D 81/3897; B65D 81/38; A61J 1/165
See application file for complete search history.

(56) References Cited

U.S. PATENT DOCUMENTS

| | | | | |
|---|---|---|---|---|
| 4,843,662 | A * | 7/1989 | Handelman | A47C 7/021 5/653 |
| 4,914,717 | A * | 4/1990 | Gibbon | A61F 7/02 219/679 |
| 5,424,519 | A * | 6/1995 | Salee | A61F 7/03 219/730 |
| 5,998,771 | A * | 12/1999 | Mariano | H05B 6/64 219/528 |
| 2003/0128898 | A1* | 7/2003 | Malone | B65D 81/052 383/3 |

(Continued)

*Primary Examiner* — Melvin Jones
(74) *Attorney, Agent, or Firm* — Bond Schoeneck & King, PLLC; George R. McGuire

(57) ABSTRACT

Thermal protection for sensitive items stored for extended periods of time in a passenger vehicle is a requirement that has not been adequately addressed by the industry. A primary object of this invention therefore, will be to provide a convenient and versatile means for forming and integrating a storage container employing appropriate phase change materials to create a controlled temperature environment for heat-sensitive articles inside an automobile, truck, or other enclosed road vehicle. As such, the invention will afford protection where summer temperatures build up to levels inside the stationary vehicle which could exceed safe limits for heat sensitive items that might be stored in the vehicle for an extended period of time; ie an hour or more. An additional optional objective will be to further include a phase change material with a substantially lower melting point to protect sensitive items from freezing during the winter months.

15 Claims, 5 Drawing Sheets

(56) References Cited

U.S. PATENT DOCUMENTS

| | | | | |
|---|---|---|---|---|
| 2009/0301511 A1* | 12/2009 | Vinci | .................... | A45C 11/008 |
| | | | | 132/316 |
| 2010/0107657 A1* | 5/2010 | Vistakula | ............. | A41D 13/005 |
| | | | | 62/3.5 |
| 2012/0048768 A1* | 3/2012 | Holloway | ............... | C09K 5/063 |
| | | | | 206/524.1 |
| 2013/0289438 A1* | 10/2013 | Lyon | ......................... | A61F 7/10 |
| | | | | 600/549 |
| 2014/0042172 A1* | 2/2014 | McNaul | ............. | A47G 23/0313 |
| | | | | 220/574.2 |
| 2014/0277302 A1* | 9/2014 | Weber | .................... | A61F 7/0085 |
| | | | | 607/104 |
| 2015/0191291 A1* | 7/2015 | Wood | .................... | B65D 81/18 |
| | | | | 200/592.1 |
| 2015/0224850 A1* | 8/2015 | Bank | ................. | B60H 1/00492 |
| | | | | 392/340 |
| 2015/0238725 A1* | 8/2015 | Tucker | ................. | A61M 21/02 |
| | | | | 600/26 |
| 2017/0096283 A1* | 4/2017 | Longley | ................. | B65D 19/38 |
| 2017/0188754 A1* | 7/2017 | Zimberg | ................. | C09K 5/063 |

* cited by examiner

PASSIVELY TEMPERATURE CONTROLLED STORAGE CONTAINER FOR AN AUTOMOBILE

REFERENCE TO RELATED APPLICATION

The present application relates and claims priority to U.S. Provisional Application Ser. No. 62/334,016, the entirety of which is hereby incorporated by reference.

BACKGROUND

1. Field of Invention

This invention relates generally to the field of heat protection for sensitive items such as portable electronics devices, magnetic, optical, and solid state data storage media, certain food and medication items, small aerosol containers, and other items that could be damaged or compromised by long duration exposure to temperatures exceeding around 90 degrees F. or higher. Such temperatures are common in parked passenger road vehicles during the summer. The invention therefore relates to a versatile product which can be conveniently deployed to protect such items in a car, as well as serve to protect the front seat of the vehicle from becoming uncomfortably hot after sun exposure while parked.

2. Background of Art

Phase change materials can be formulated to absorb large quantities of heat while transitioning from the solid to liquid state. The key feature of this process is that the material stays at an essentially constant temperature (or narrow temperature range) during the entire phase transition process. This unique property allows these materials to be used to maintain a fixed constant temperature environment inside a thermally insulated enclosed space or container. As such, articles inside this enclosed space can be essentially maintained at a temperature close to this phase transition temperature (whether the phase change material is melting or solidifying/freezing) for the duration of this phase transition process. The most commonly known and utilized phase change material is water. In the form of ice, it is typically placed inside an insulated cooler to keep food from spoiling during transition in car, to a cookout, for example. The real advantage of these materials is that they provide a passive means of temperature control (ie. without the need for active/electrically-powered heating or cooling). The disadvantage is that their effectiveness is temporary, and as such they need to be reactivated (ie. the ice pack needs to be placed in a freezer for a period of time before it can be reused in the portable cooler). Numerous materials exist naturally or have been formulated to melt at specific temperatures (temperature ranges), and can thus be utilized to provide temperature control for specific applications.

Although the most commonly known and historically earliest employed prior art use of phase change materials for thermal protection is the water/ice example described above, there have since been a considerable number of new materials explored and developed over the past several decades. Most of these fall into the class of either long carbon chain organics such as waxes and other high molecular weight compounds such as polyethylene glycols, or hydrated inorganic salts, such as hydrates of sodium carbonate, sodium borate, sodium sulfate, and bi-sodium or tri-sodium phosphate. Many of the latter are eutectic combinations of these salts formulated to achieve specific melting point ranges and to optimize the transition state change energy per unit mass of the material. These materials have found uses such as incorporation into protective packaging for transportation of heat-sensitive items by road and rail. Such materials are formulated to protect against temperatures that significantly exceed outside ambient temperatures when items are transported inside a shipping container in a hot climate. Therefore, a material formulated for this type of application might have a melting point of around 80 to 100 degrees F.

Another use for such higher melting point materials is found in thermal moderation and control for houses and other buildings in warmer climates, particularly in desert climates, with very high daytime temperatures, and much cooler nighttime temperatures. As such, panels of the phase change material placed in the walls or attic space absorb excess heat during the day (while melting), and release that heat at night (while solidifying). Thus, they can be used to passively reduce cooling and heating requirements for the building.

A particular application that has not been addressed by the market is the protection of heat-sensitive items during transport in a passenger car or truck. Therefore, there is a need for a unique and very convenient and passive means of heat protection for such heat-sensitive items for the average consumer while carrying such items during road travel.

3. Objects and Advantages

It is a principal object and advantage of the present invention to provide a thermally-protective, thermally insulated container that fits conformally to the inside of passenger car or truck, and thus does not appreciably intrude into the useable passenger space of the vehicle, and which is easily accessible to the user for stowage and retrieval of stored items.

It is a further object and advantage of the present invention to incorporate panels of an appropriate phase change material into the walls of the container, such that the phase change material covers an appreciable (ie. 50% or more) amount of the surface area of the walls of the container, and has sufficient mass to maintain a temperature inside the container close to its melting point temperature for a time period sufficient to protect its contents for an entire daytime period of maximum sun exposure on the hottest day of the year for the climate in which it is deployed. Note further that the melting point of the material is chosen to be high enough so that it is higher than the average nighttime temperature inside the vehicle, the purpose being so that it can solidify before the next daytime cycle.

It is another object and advantage of the present invention to provide a conformal container which hangs by a strap over the top of the vehicle seat head-rest/restraint and rests conformally against the back of the seat. Although essentially flat, the container could be constructed to be expandable in the direction away from the seat back to allow for storage of larger or a greater number of items. As such, the container could be made as a soft-shell bag or pouch (like a standard laptop computer carrying bag). The container could further incorporate a hook or slat (that inserts into the pouch that is incorporated into the back of the car seat (for carrying maps, etc. by the auto manufacturer) that holds the container more conformally (tightly) against the back of the car seat. A second similar configuration entails positioning and securing the container at the lower part of the seat back, with the bottom of the container positioned on or very close to the vehicle floor.

It is yet another object and advantage of the present invention to provide for the optional ability of the product to readily and reversibly convert into a cover for the driver or passenger seat to protect it from becoming uncomfortably hot for the person entering the vehicle after it has been sitting in the sun for an extended time period. As such, the aforementioned soft-shelled container could be made to have detachable sides (via zipper, Velcro, etc.) that allow it to be unfolded into a continuous long cover that drapes over the back and the vertical (seat back) and horizontal front surfaces of the driver's (or passenger) seat; by detaching the sides, unfolding, and rotating the cover via the head-rest strap over to the front of the seat, and draping the cover conformally over the sun-exposed seat. Thus, the product would have a dual use utility.

It is an additional object of the present invention to provide a unique means of packaging the phase change materials for integration into the walls of the aforementioned heat-protective container. For the most part, this will include one or more means of soaking the melted phase change material into an appropriate absorbent matrix material and then hermetically sealing this into a heavy plastic film. This technique could include the optional addition of an outer proportionally thin conformal layer of absorbent fabric (or material with similar absorbency properties) to prevent leakage of the melted phase change material into the storage compartment of the container if the phase change material package is punctured or otherwise compromised.

Other objects and advantages of the present invention will in part be obvious and in part appear hereinafter.

SUMMARY OF THE INVENTION

In accordance with the foregoing objects and advantages, various aspects and embodiments of the present invention provide a passively temperature controlled storage container for an automobile.

The system includes a thermally protective, thermally insulated container. The container has an outer shell having front and back panels that are selectively movable between enclosed and separated positions, a thermal insulation layer of material positioned interiorly adjacent said front and back panels, a first compartment defined between said front and pack panels and in which is stored a phase change material, and an open and user accessible second compartment defined between said front and back panels and adapted to receive and stow an item therein. The phase change material has a heat of fusion in the range of 150 to 300 Joules/gram and a melting point in the range of 75 to 90 degrees F.

The method for constructing a phase change material packet comprises the steps of absorbing a phase change material in a liquid state into a sheet of open cell foam, wherein the phase change material has a feat of fusion between 150 to 300 Joules/gram, then sealing the open cell foam into a plastic membrane to form the phase change material packet, wherein the phase change material has a melting point range of 75 to 90 degrees F. Next, the method may also include the steps of absorbing a second phase change material in a liquid state into a second sheet of open cell foam, wherein the second phase change material has a melting point range of 50 to 60 degrees, and then sealing the second open cell foam into the plastic membrane of the phase change material packet.

BRIEF DESCRIPTION OF THE DRAWINGS

Embodiments and aspects of the present invention will be more fully understood and appreciated by reading the following Detailed Description in conjunction with the accompanying drawings, in which.

DETAILED DESCRIPTION

Figure 1:
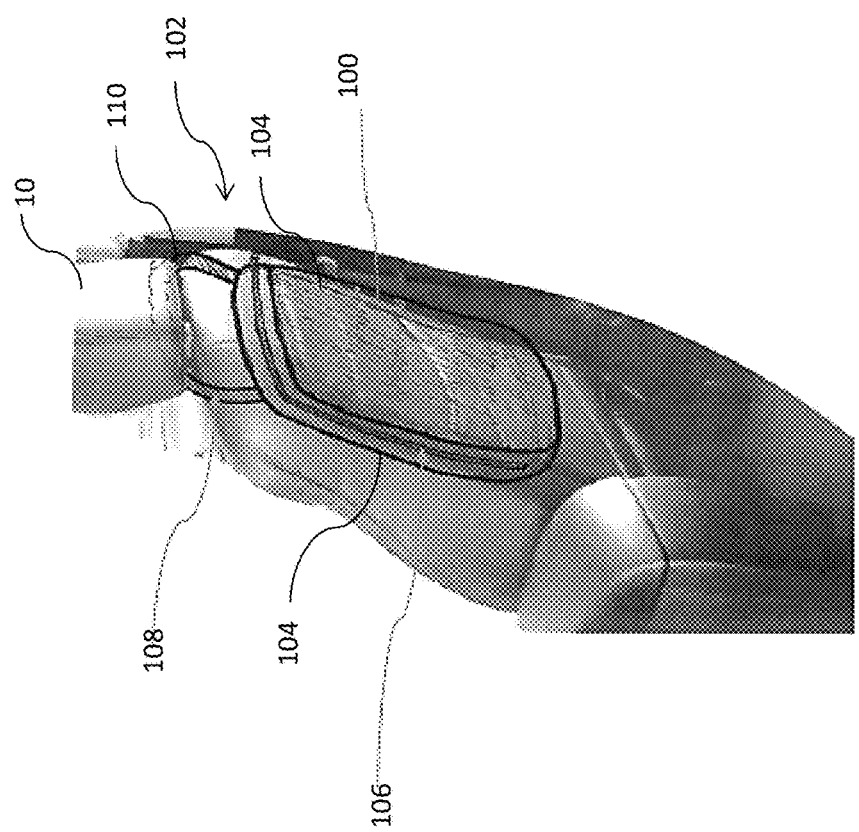
FIG. 1 is a perspective view of an illustrative embodiment of the storage container on the back of an automobile seat via a strap that loops over the seat head rest.
Figure 2:
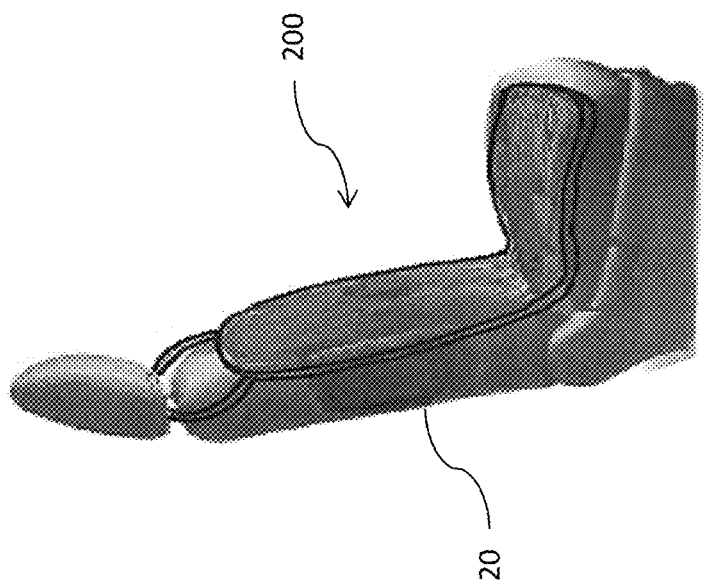
FIG. 2 is a side view of an alternative illustrative embodiment of the storage container on the front of an automobile seat.
Figure 3:
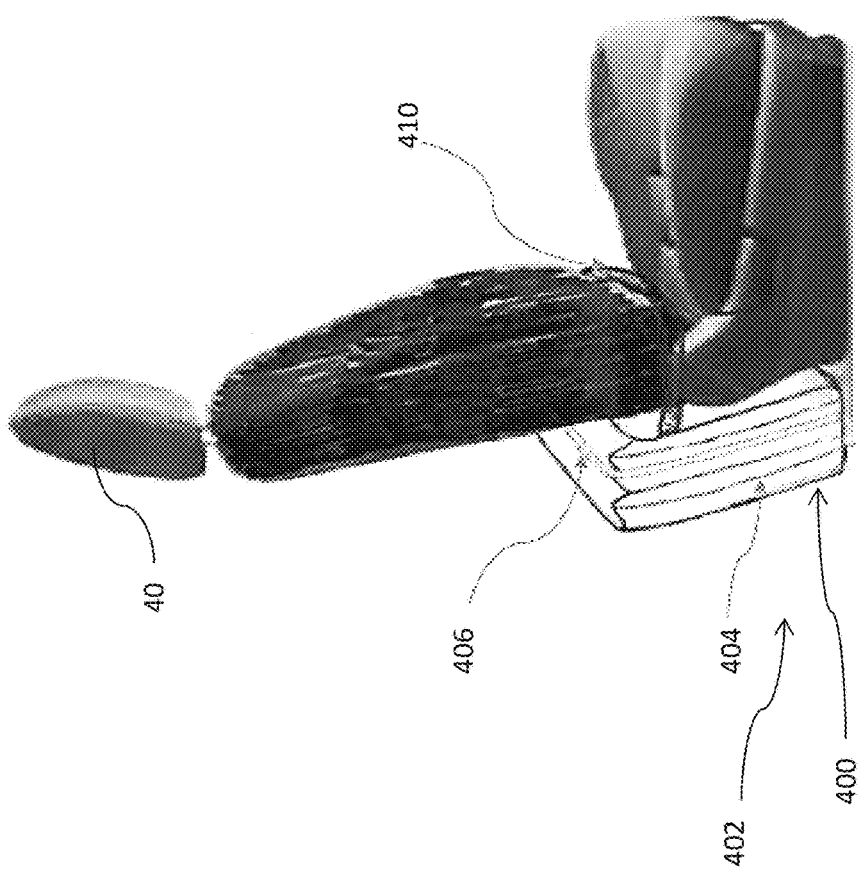
FIG. 3 is a side view of an alternative illustrative embodiment of storage container on the floor of the automobile and wrapped around an automobile seat.
Figure 4:
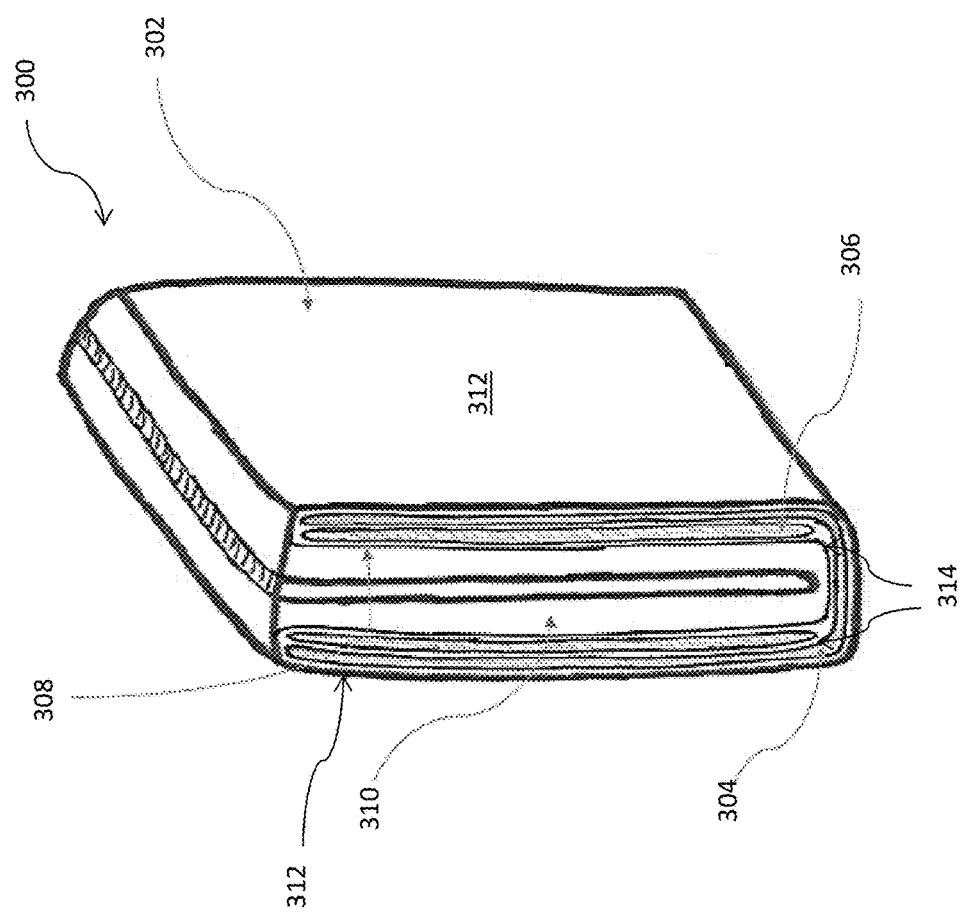
FIG. 4 is an isometric cross-sectional view of an illustrative embodiment of the pouch of FIG. 1 (or FIG. 3) showing an outer shell layer, a thermal insulation layer, the sealed phase change material packets, and a means of joining the sides together (ie. Velcro, zipper, etc.) to form the pouch.

Referring first to FIG. 1, there is shown a perspective view of an illustrative embodiment of the storage container 100 secured on the back of an automobile seat 10 via a strap 110. As shown in FIG. 1, the invention can be seen as a container 100 or pouch which opens at the top 102, and optionally further opens along both sides 104 to form a long continuous cover 200 as shown in FIG. 2. Note that opening and closing of the pouch could be accomplished by any number of standard means such as a zipper 106 (as shown in FIGS. 1, 3, and 4) or overlapping flaps (not shown) with Velcro, for example. The cover 200 configuration could be used to drape over the front seat 20 to keep it cool, or could also be thrown over items anywhere inside the vehicle (ie. items lying on the back seat) that need heat protection.

Note that the walls 312 of the pouch 300 are structured as shown in FIG. 4. Thus they contain a (preferably flexible) outer shell 302 (i.e. heavy nylon fabric) and outer thermal insulation layer 304 (preferably a flexible foam such polyurethane or closed cell polyethylene), followed by a sealed packet 306 containing the heat absorber (phase change material) shown in detail in FIG. 5. A final thin shell layer 308 (i.e. thin plastic sheet or nylon fabric) isolates the phase change packet 306 from the inner (storage) compartment 310 of the pouch 300.

It should be noted that FIGS. 1 and 3 depict the pouch 100, 400 as an external attachment to either upper (102 in FIG. 1) or lower (402 in FIG. 3) seat back of the automobile. It is understood that in either case, the pouch could be either partially or wholly embedded into or otherwise integrated with the car seat 10, 40 as part of a modified seat design. The attachment/integration to the seat back provides a convenient means of placement of the pouch which is least intrusive to the passenger compartment, and which provides for easy access to the items stored within. The FIG. 3 configuration is the only option that would be allowable in the case where the vehicle design incorporates rear-passenger airbags that deploy from the seat back.

Now, as detailed in FIG. 4 the large walls 312 (the ones parallel to the seat back) of the pouch are preferably 16" to 20" wide and 16" to 18" high. It is clear that thermal foam insulation 304 should cover the entire surface area of all sides, while the phase change material packets 306 should cover a substantial surface area (ie preferably at least 80 to 90 percent) of the two larger sides 312. With the inclusion of expandable (ie pleated) sides 314 as shown in FIG. 3, the pouch 300 could expand as needed to a foot or more in the direction away from the seat back. It is desirable that the pouch 300 be able to hold a laptop computer in its standard carrying case, as a minimum. Note that said expandable sides 314 should be lined with the thermal foam insulation 304, as a minimum, with the possible inclusion of additional phase change material 306.

Figure 5:
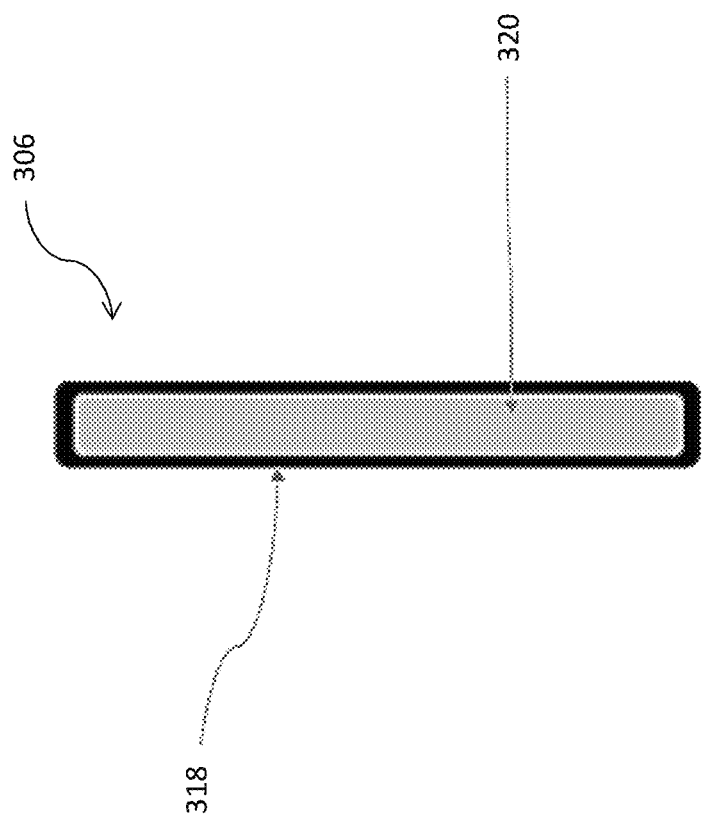
FIG. 5 is a cross-sectional side view of an illustrative embodiment of the phase change material packet revealing the outer leak-proof shell, and the actual phase change material that fills the inner volume.

FIG. 5 shows cross-sectional view of the phase change material packet 306 which essentially comprises a relatively thin, water-impervious outer shell 318, which defines a completely enclosed volume containing the phase change material 320. This outer shell 318 is preferably composed of a plastic (ie polyethylene or polypropylene) membrane (at least about 0.004 to 0.006 inches thick) or a relatively thin molded (ie blow-molded) enclosure with a sealable fill area (fill hole) to insert the phase change material 320. In the case where the shell 318 is sufficiently rigid to maintain its shape when filled with the liquid phase change material 320 the liquid can simply be injected into the shell 318 and sealed to form the phase change material packet 306. The total quantity of phase change material 320 anticipated to be required for the embodiment of the invention as depicted in the above description and the drawings is about 2 to 10 pounds, depending on the heat of fusion of the material and the environmental conditions under which it is employed.

The present invention also proposes an alternate novel method of constructing the phase change material packet 306. This includes absorbing the material in the liquid state into a sheet of open cell foam (ie. [polyurethane foam, in a quantity up to the point of saturation of the foam) and then sealing (preferably vacuum-sealing into a plastic membrane to form the phase change material packet 306. In this form, the packet 306 will hold its essential shape even when the phase change material is in the liquid state. This, and other methods of packaging and encapsulation of phase change materials known to anyone skilled in the art could be employed for use in this invention.

Note in all of the above that the phase change material should have a heat of fusion of about 150 to 300 Joules/gram (higher is always better), and a melting point in the range of around 75 to 90 degrees F. An ideal phase change material should have a melting point that is below the extended time exposure damage threshold of the items to be protected, and above the ambient temperature inside the car during the night. The reason for the latter is so that the phase change material can give up its latent heat and return to the solid state before the next daytime cycle.

Another variation on the above could be to incorporate one or more additional layers of phase change materials with differing melting temperatures. For example, the above embodiment could further include another phase change material packet layer (not depicted in the drawings), with said additional layer having a much lower melting point (ie. 50 to 65 degrees F.). Although this phase change material layer would do little to protect items from heat when night time ambient temperatures inside the car never drop below 65 degrees F. during the summer, it would solidify and release heat in the colder months to protect cold-sensitive items such as certain medications from freezing. As such, it would be assumed that the inside temperature of the car would be warm enough for long enough while driving to melt the lower-temperature phase change material. This could be enhanced by actively adding heat to the material, by channeling heater vent air or using a small electric resistance heater to cause melting (not depicted in the drawings). Note that a similar technique could be used to accelerate cooling of the higher temperature phase material via channeling of cold air (air conditioner air) over the phase change material packet 306, for example. Implementation of this feature would be much more feasible in the case where the invention is incorporated into the seat back (or other area) of the vehicle (as described previously) instead of being provided in the form of an add-on storage pouch as depicted in the drawings.

One further optional aspect of this invention could be to include some form of temperature sensing and display for the user. This could be as simple as a low-tech liquid crystal indicator strip or liquid thermometer, or an electronic temperature sensor with a blue tooth link to a smart phone app. The latter could incorporate a small solar cell and battery to provide passive power for the electronics.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A thermally protective, thermally insulated container, comprising:
   a. an outer shell having front and back panels that are selectively movable between enclosed and separated positions;
   b. a thermal insulation layer of material positioned interiorly adjacent said front and back panels;
   c. a first compartment defined between said front and pack panels and in which is stored a phase change material; and
   d. an open and user accessible second compartment defined between said front and back panels and adapted to receive and stow an item therein;
   e. wherein said phase change material has a heat of fusion in the range of 150 to 300 Joules/gram and a melting point in the range of 75 to 90 degrees F.

2. The container of claim 1, wherein the outer shell layer is composed of flexible, heavy nylon fabric.

3. The container of claim 1, wherein the front and back panels comprise a thin shell layer composed of at least one of a thin plastic sheet or nylon fabric.

4. The container of claim 1, wherein the back panel of the container rotates at least 180 degrees away from the front panel.

5. A method for constructing a phase change material packet, comprising the steps of:
   a. absorbing a phase change material in a liquid state into a sheet of open cell foam;
   b. wherein the phase change material has a heat fusion between 150 to 300 Joules/gram;
   c. sealing the open cell foam into a plastic membrane to form the phase change material packet.

6. The method of claim 5, wherein the phase change material has a melting point range of 75 to 90 degrees F.

7. The method of claim 5, further comprising the step of:
   a. absorbing a second phase change material in a liquid state into a second sheet of open cell foam;
   b. wherein the second phase change material has a melting point range of 50 to 60 degrees; and
   c. sealing the second open cell foam into the plastic membrane of the phase change material packet.

8. The method of claim 5, wherein the phase change material is heat absorbing material.

9. The method of claim 5, wherein the open cell foam is polyurethane foam.

10. The method of claim 5, wherein the step of sealing the open seal foam is vacuum sealing.

11. A thermally protective, thermally insulated container, comprising:
   a. an enclosed pouch with two walls, each having an entire inner surface area with thermal foam insulation; and
   b. phase change material packets on a substantial portion of the entire inner surface area of the walls;
   c. wherein the thermal foam insulation is between the phase change material and the inner surface area of the walls;
   d. wherein said phase change material has a heat of fusion in the range of 150 to 300 Joules/gram and a melting point in the range of 75 to 90 degrees F.

12. The container of claim 11, further comprising expandable sides of the pouch, which are approximately perpendicular to the walls.

13. The container of claim 11, further comprising an outer shell layer on an exterior surface of the walls, having front and back panels that are selectively movable between enclosed and separated positions.

14. The container of claim 11, further comprising an inner storage compartment between phase change material packets on opposing walls.

15. The container of claim 11, further comprising a thin shell layer isolating the phase change material packet from the inner compartment.

* * * * *